(12) United States Patent
Zhang

(10) Patent No.: US 9,866,253 B2
(45) Date of Patent: Jan. 9, 2018

(54) BENDABLE DEVICE HAVING RIGID RECEIVING SPACE AND ELECTRONIC APPARATUS

(71) Applicants: Beijing Lenovo Software Ltd., Haidian District, Beijing (CN); Lenovo (Beijing) Co., Ltd., Haidian District, Beijing (CN)

(72) Inventor: Ran Zhang, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 57 days.

(21) Appl. No.: 14/976,148

(22) Filed: Dec. 21, 2015

(65) Prior Publication Data

US 2017/0077978 A1    Mar. 16, 2017

(30) Foreign Application Priority Data

Sep. 16, 2015    (CN) .......................... 2015 1 0591687

(51) Int. Cl.
*H04B 1/3888* (2015.01)
*H04B 1/3827* (2015.01)

(52) U.S. Cl.
CPC .......... *H04B 1/3888* (2013.01); *H04B 1/385* (2013.01)

(58) Field of Classification Search
None
See application file for complete search history.

(56) References Cited

U.S. PATENT DOCUMENTS

| | | | | |
|---|---|---|---|---|
| 4,419,770 A | * | 12/1983 | Yagi ..................... | G04B 47/025 368/10 |
| 5,134,251 A | * | 7/1992 | Martin ................. | H02G 3/0475 138/110 |

* cited by examiner

*Primary Examiner* — David Bilodeau
(74) *Attorney, Agent, or Firm* — Brinks Gilson & Lione; G. Peter Nichols

(57) ABSTRACT

Embodiments of the present disclosure provide a bendable device having rigid receiving space that include a bendable housing having a receiving space therein, and in the process of the bendable housing being bent, at least a part of the volume of the receiving space is free from bending influence, thus the at least partial volume of the receiving space free from the bending influence constitutes a rigid receiving space.

13 Claims, 4 Drawing Sheets

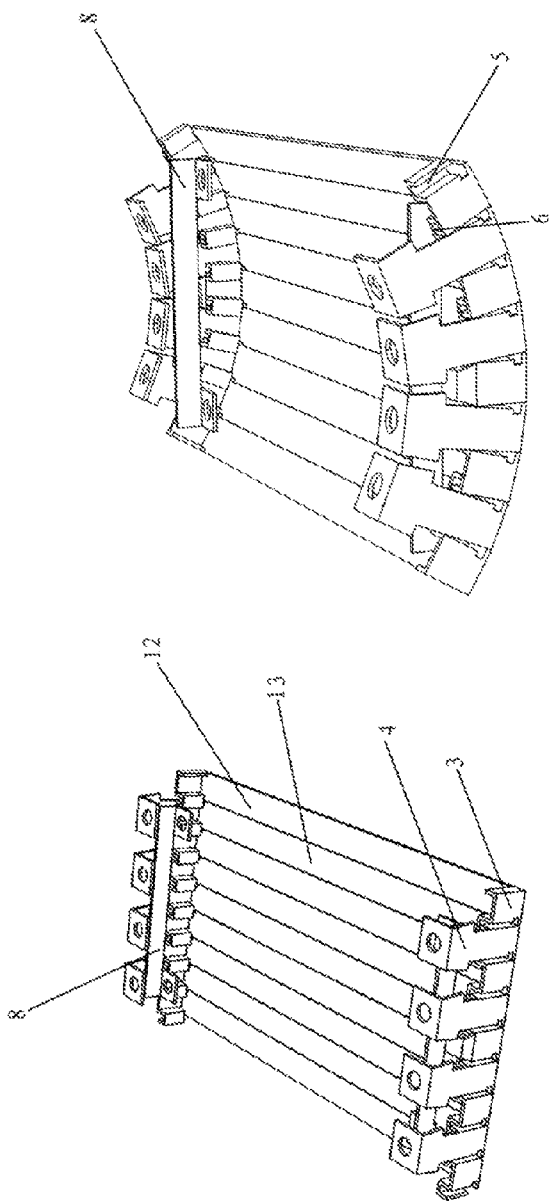
Fig. 5
Fig. 6
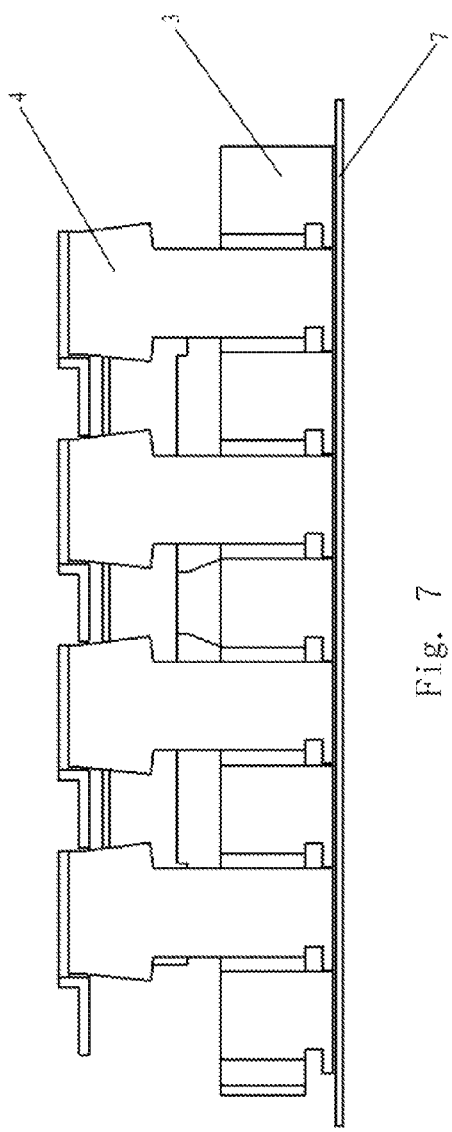
Fig. 7

BENDABLE DEVICE HAVING RIGID RECEIVING SPACE AND ELECTRONIC APPARATUS

This application claims priority to Chinese Patent Application No. 201510591687.5 filed Sep. 16, 2015, the entire contents of which are incorporated herein by reference.

BACKGROUND

The present disclosure relates to a housing including a receiving space, and more particularly, to a bendable device having rigid receiving space and an electronic apparatus having such a bendable device.

With the development of technology, the requirement for the structure of an electronic products is getting increasingly higher, while in conventional structure, fixed space is always used for the placement of electron devices, wearable product has a great impact on the fixed structure, and conventionally, the wearable product can only be split into a curved portion and a straight portion, the curved portion cannot be placed with any electronic devices therein, and the straight portion has a limited space. For example, the bracelet products popular on the market can be divided into two parts, one part is a plastic band surrounding the arm, the middle of the plastic band is provided with a straight receiving space, while the other part is the electronic devices of the bracelet received within the straight receiving space of the plastic band.

As shown in FIG. 1, the electronic device 1' is conventionally arranged into a receiving space constituted with the unbendable cover 2' and cassette body 3'.

SUMMARY

Embodiments of the present disclosure provides a bendable device having rigid receiving space, the technical solution thereof is: a bendable device having rigid receiving space, which device comprises a bendable housing having a receiving space therein, and in the process of the bendable housing being bent, at least a part of the volume of the receiving space is free from bending influence, thus the at least partial volume of the receiving space free from the bending influence constitutes a rigid receiving space.

The bendable device having rigid receiving space according to the present disclosure provides a bendable housing, such a bendable housing has a rigid receiving space therein which is free from the bending influence of the bendable housing in the process of the bendable housing being bent, the desired objects can be placed into the rigid receiving space so as to provide support, receiving and protection for the objects.

The bendable housing is provided with a support frame for supporting the objects placed in the rigid receiving space.

The bendable housing comprises a plurality of brackets and a plurality of connecting frames, the brackets and the connecting frames are arranged in an alternative way, and each adjacent bracket and connecting frame overlap with each other, thereby forming a bendable housing.

The bendable housing employs a splicing configuration in which the abutting bracket and connecting frame are overlapped with each other to form the bendable housing.

Each abutting bracket and connecting frame overlap with each other by means of an overlapping portion, the overlapping portion constitutes a stopper portion for the bracket, and such a stopper portion restricts the extent by which the bracket moves to the inside and outside of the bendable housing.

The stopper portion restricts the extent by which the bracket is bent, thereby it is possible to restrict the extent by which the entire bendable housing is bent, so as to ensure that a rigid receiving space, which is always free from the bending influence, is provided in the bendable housing.

At least one connecting frame or at least one bracket is provided with a support frame for supporting the objects placed in the rigid receiving space.

The support frame may be merely provided on the connecting frame or on the bracket, and alternatively, the support frame may be provided both on the connecting frame and the bracket, and may also be provided on a plurality of connecting frames and/or a plurality of brackets, specific arrangement for the support frame can be made in various modification and combination according to requirement.

The bendable housing further comprises a bendable plate, the connecting frames and the brackets are placed on the first surface of the bendable plate.

For the purpose of securing and connecting the spliced connecting frame and bracket even more firmly, and also for the purpose of preventing external contamination from extensively entering into the bendable housing, a bendable plate is provided at the bottom of the spliced connecting frame and bracket so as to bend as the connecting frame and bracket are bent.

A first part of the connecting frame and a first part of the bracket are each an elongate plate, and the first part of the connecting frame and the first part of the bracket are arranged in parallel.

The splicing using elongate plates allows for the formation of a relatively huge space in longitude direction. The plane where the first part of the bracket is located and the plane where the first part of the abutting connecting frame is located form an angle by relative movement, the acute angle of the angle is not greater than 7.5°.

In the upward direction of the ends at both sides of the first part of the connecting frame and the first part of the bracket in their longitudinal direction, the two opposites end parts at each end are provided with a receiving groove and a projection respectively, and the bracket and the connecting frame are connected in such a way that, at each side end of the bracket and the connecting frame in the longitudinal direction of the elongate plate, the projection of the bracket is received in the receiving groove of the connecting frame, the projection of the connecting frame is received in the receiving groove of the bracket, so that the bracket and the connecting frame can be spliced together and move relative to each other, thus constituting the bendable housing, while the abutting projection of the connecting frame and the receiving groove of the bracket as well as the abutting receiving groove of the connecting frame the projection of the bracket constitute the overlapping portions.

The receiving groove of the connecting frame restricts the movement of the projection of the bracket, and the receiving groove of the bracket restricts the movement of the projection of the connecting frame, thereby restricting the relative movement between the plane where the first part of each bracket is located and the plane where the first part of the abutting connecting frame is located.

The upper side of each bracket is provided with a corresponding cover board forming the upper cover of the bendable housing.

With the cover board, it is possible to encapsulate the objects within the bendable device having rigid receiving space.

Each cover board is divided into a first part and a second part, the first and second parts are provided with a recess transition there between and thus located at different heights, the first part is connected at the top end of the bracket, when the bendable housing bends inward, the second part can be covered by the first part of the abutting cover board.

The present invention also provides an electronic apparatus having the above mentioned bendable device having rigid receiving space.

The bendable device having rigid receiving space according to the present disclosure provides a rigid receiving space free from bending influence for objects, the objects can be placed within the bendable device having rigid receiving space, thereby it may be laid on a position to be bent while the objects is free from bending influence, for example, the objects is worn on the human body, such as the arm.

When the bendable device having rigid receiving space is used for an electronic apparatus, the electronic device may be arranged within the bendable device having rigid receiving space, thereby preventing the electronic device from bending influence.

BRIEF DESCRIPTION OF THE DRAWINGS

Other advantages and features of the present disclosure will become even more clear and apparent from the following description about special embodiments of the present disclosure given only by way of nonrestrictive examples and illustrated in the drawings, in which:

FIGS. 5 and 6 show schematic views of the bendable device having rigid receiving space when the cover board and electronic devices are removed which is in a unbent state and in a bent state, respectively;

FIG. 7 is a sectional schematic view of FIG. 5 in which the bendable device having rigid receiving space is in a unbent state;

REFERENCE NUMERALS

Figure 2:
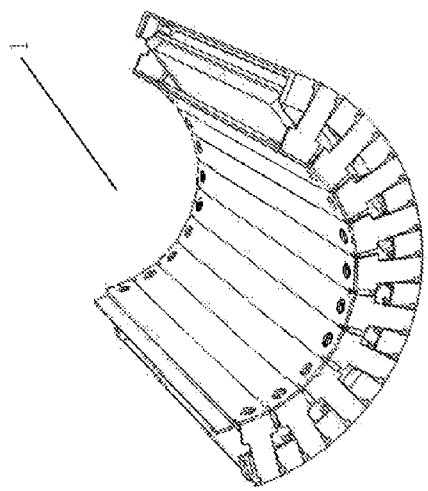
FIG. 2 shows a schematic view of a bendable device having rigid receiving space according to the present disclosure which is in a bent state.

1' electronic device
2' cover board
3' cassette body
1 Bendable device having rigid receiving space
2 Object
3 Connecting frame
4 Bracket
5 Receiving groove
6 Projection
7 Bendable plate
8 Support frame
9 Cover board
10 First part
11 Second part
12 a first part of the connecting frame
13 a first part of the bracket

DETAILED DESCRIPTION

A detailed description will be give about the bendable device having rigid receiving space according to the present disclosure in conjunction with FIGS. 2 to 13.

Figure 4:
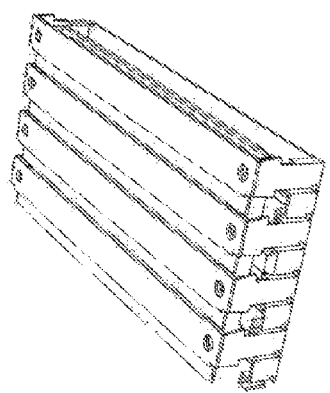
FIG. 4 shows a schematic view of a bendable device having rigid receiving space according to the present disclosure, which is in a unbent state.
Figure 1:
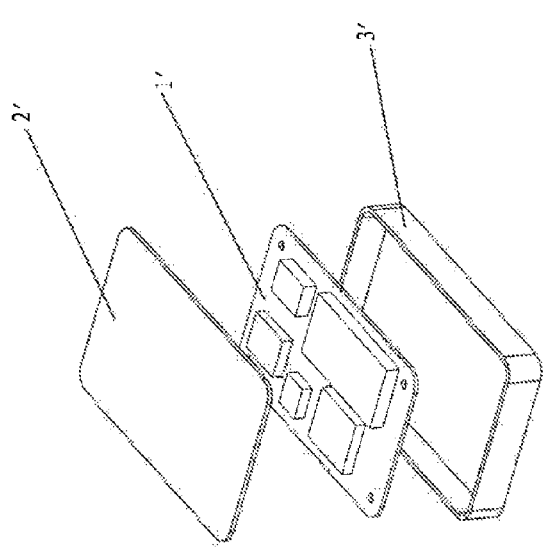
FIG. 1 shows a device for receiving the electronic devices.
Figure 3:
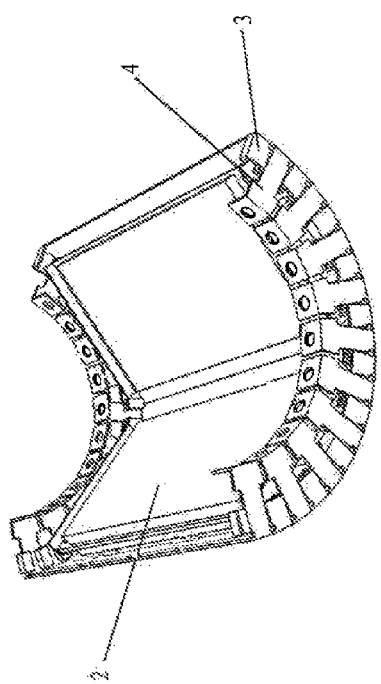
FIG. 3 shows a schematic view of the bendable device having rigid receiving space shown in FIG. 2 after the cover board is removed.

FIG. 2 is a schematic view showing a bendable device having rigid receiving space according to the present disclosure in a bent state, FIG. 3 shows a state in which the cover board of FIG. 2 is removed, and FIG. 4 is a schematic view in its laid flat state. FIGS. 5 and 6 show schematic views of the bendable device having rigid receiving space when the cover board and electronic devices are removed in an unbent state and in a bent state, respectively. It is clear from FIGS. 2 to 6 that the bendable device 1 having rigid receiving space according to the present disclosure comprises a bendable housing, the bendable housing has a receiving space therein, and in the process of bending the bendable housing, a part of the receiving space is free from bending influence, such as the space for receiving the object 2 shown in FIG. 3, and since such a receiving space is free from bending influence, the object 2 received within the receiving space is unlikely subjected to influence caused by the bending of the bendable housing. The bendable housing comprises a plurality of brackets 4 and a plurality of connecting frames 3, the brackets 4 and the connecting frames 3 are arranged in an alternative way, and each abutting bracket 4 and connecting frame 3 overlap with each other, thereby forming a bendable housing. See FIG. 9 for a detailed schematic view of the connecting frame 3. A first part 12 of the connecting frame and a first part 13 of the bracket are each elongate plates, the first part 12 of the connecting frame and the first part 13 of the bracket are arranged in parallel, thereby the elongate plates are spliced together so as to form a continuous plane.

In an embodiment, the acute angle of the angle formed through relative movement between the plane where the first part 13 of each bracket is located and the plane where the first part 12 of the abutting connecting frame is located has its maximum angle not greater than 7.5°, such an angle is the most optimum relative movement angle proved by experiments of the inventor of the present disclosure, and could highly prevent the rigid receiving space from being subjected to the influence of the bending of the bendable housing.

Figure 9:
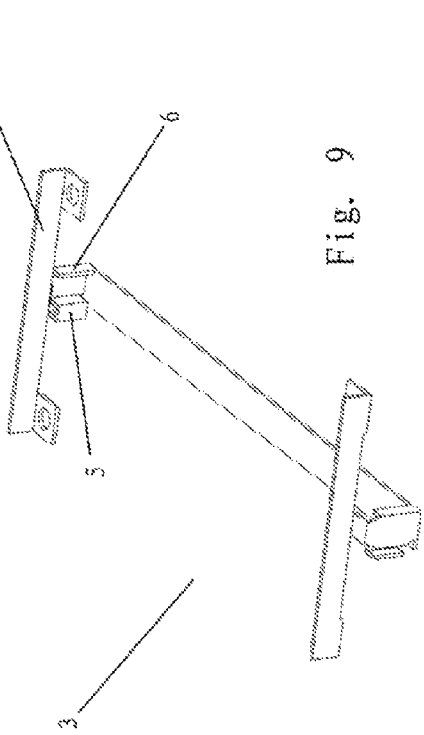
FIG. 9 is a structural schematic view of the support frame.
Figure 11:
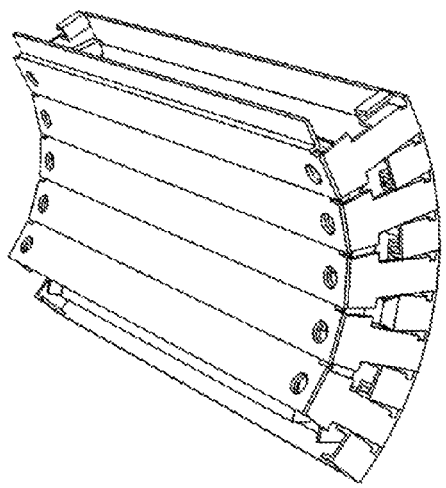
FIGS. 10 and 11 show the bendable device having rigid receiving space, which is in a unbent state and in a bent state, respectively.
Figure 13:
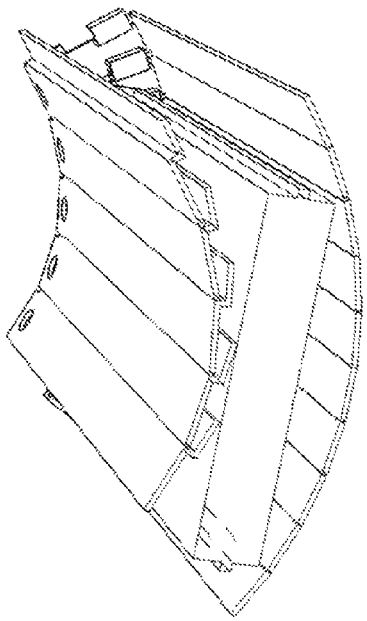
FIGS. 12 and 13 show the bendable device having rigid receiving space, which is in a unbent state and in a bent state respectively, the end at one side thereof is remove for the purpose of better observing the electronic devices received therein.
Figure 10:
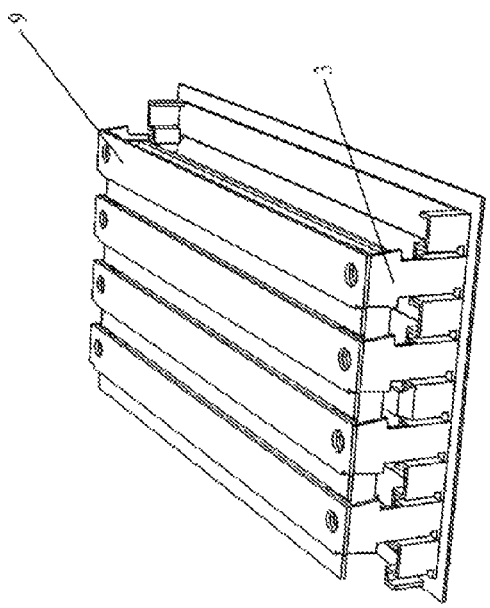
Figure 12:
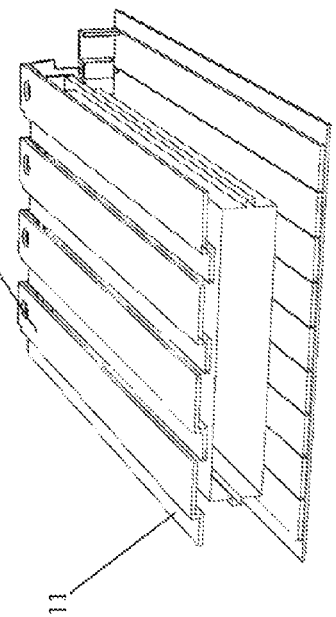

In the longitudinal direction of the first part 12 of the connecting frame and the first part 13 of the bracket (such as, the vertical direction in FIG. 5), and in the upward direction from the paper surface at the ends of its two sides, a receiving groove 5 and a projection 6 are provided at opposite two end parts (that is, two end parts in the left and right direction) of each end respectively (the most clear schematic view of the receiving groove 5 and the projection 6 of the connecting frame can be seen in FIG. 9). In this embodiment, at the two side ends of the connecting frame and the bracket in the longitudinal direction of the elongate plate, a receiving groove and a projection are both provided at the left end part and the right end part in the upward direction from the paper surface. The bracket and the connecting frame are connected in such a way that, at each side end of the bracket and the connecting frame in the longitudinal direction of the elongate plate, the projection of the bracket is received into the receiving groove of the connecting frame, and the projection of the connecting frame is received into the receiving groove of the bracket, thereby the bracket and the connecting frame are spliced together and can move relative to each other, thus forming the bendable housing, the abutting projection of the connecting frame and receiving groove of the bracket as well as the abutting receiving groove of the connecting frame and projection of the bracket constitute the overlapping portion. The receiving groove of the connecting frame restricts the movement of the projection of the bracket, and the receiving groove of the bracket restricts the movement of the projection of the connecting frame, thereby restricting the relative movement between the plane where the first part of each bracket is located and the plane where the first part of the abutting connecting frame is located.

As shown in FIGS. 5 and 6, the bendable housing is provided with a support frame 8 for supporting the objects placed in the rigid receiving space.

In this embodiment, the support frame is arranged on the connecting frame, however, the support frame may also be arranged on the bracket, or the bracket and the connecting frame are provided with support frames respectively, there may be provided with one or more support frame(s). The specific arrangement of the support frame may be subjected to various modification and combination as required.

Figure 8:
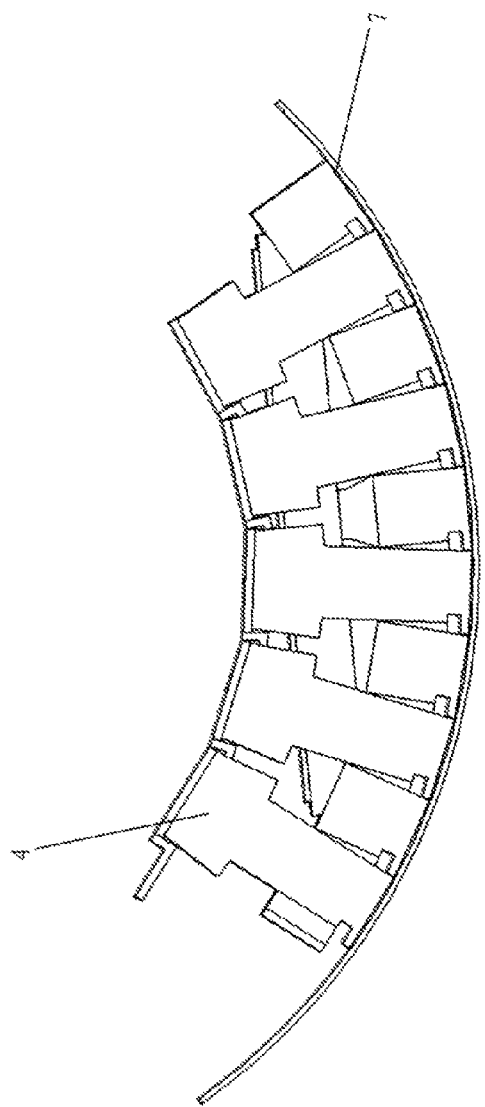
FIG. 8 is a sectional schematic view of the bendable device having rigid receiving space, which is in a bent state.

FIGS. 7 and 8 are sectional schematic views of the bendable device having rigid receiving space. The bendable housing further comprises a bendable plate 7, the connecting frames 3 and the brackets 4 are placed on the upper side of the bendable plate 7.

For the purpose of securing and connecting the spliced connecting frame and bracket even more firmly, and also for the purpose of preventing external contamination from extensively entering into the bendable housing, a bendable plate is provided at the bottom of the spliced connecting frame and bracket so as to bend as the connecting frame and bracket are bent.

FIGS. 10 to 13 show different states of the bendable device (provided with a cover board) having a rigid receiving space according to the present disclosure. The upper side of each bracket 3 is provided with a corresponding cover board 9 forming the upper cover of the bendable housing. With the cover board, it is possible to encapsulate the objects within the bendable device having rigid receiving space.

Each cover board 9 is divided into a first part 10 and a second part 11, the first and second parts 10, 11 are provided with a recess transition there between and thus located at different heights, the first part 10 is higher than the second part 11, the first part 10 is connected at the top end of the bracket 3, when the bendable housing bends inward, the second part 11 is covered by the first part 10 of the abutting cover board.

The bendable device having rigid receiving space according to the present disclosure provides a rigid receiving space free from bending influence for objects, the objects can be placed within the bendable device having rigid receiving space, thereby it may be laid on a position to be bent while the objects is free from bending influence, for example, the objects is worn on the human body, such as the arm.

Embodiments of the present disclosure also provide an electronic apparatus having the above mentioned bendable device having rigid receiving space.

When the bendable device having rigid receiving space is used for an electronic apparatus, the electronic device may be arranged within the bendable device having rigid receiving space, thereby preventing the electronic device from bending influence.

The above provides detail introduction of the present invention, and the variations made by the skilled in this art based on the idea of the embodiment of present invention about particular embodiments and the range of application should not be construed as departing from the protective scope of the present invention, generally speaking, the content of this specification should not be regarded as limiting to the present invention.

The invention claimed is:

1. A bendable device having a rigid receiving space, wherein the device comprises a bendable housing having
 a bendable plate,
 a plurality of brackets and a plurality of connecting frames placed on a first surface of the bendable plate, the brackets and the connecting frames being arranged in an alternating manner, with each abutting bracket and connecting frame overlapping with each other to define a bendable housing,
 a receiving space therein, and in the process of the bendable housing being bent, at least a part of the volume of the receiving space is free from bending influence, such that the at least part volume of the receiving space free from the bending influence constitutes a rigid receiving space.

2. The bendable device according to claim 1, wherein the bendable housing is provided with a support frame for supporting objects placed in the rigid receiving space.

3. The bendable device according to claim 1, wherein each abutting bracket and connecting frame overlap with each other by an overlapping portion that constitutes a stopper portion for the bracket, and wherein the stopper portion restricts the extent by which the bracket moves to an inside and outside of the bendable housing.

4. The bendable device according to claim 3, wherein at least one connecting frame or at least one bracket is provided with a support frame for supporting objects placed in the rigid receiving space.

5. The bendable device according to claim 3, wherein a first part of the connecting frame and a first part of the bracket are each an elongate plate, and the first part of the connecting frame and the first part of the bracket are arranged in parallel.

6. The bendable device according to claim 5, wherein a plane where the first part of each bracket is located and a plane where the first part of the abutting connecting frame is located form an angle by relative movement, wherein an acute angle of the angle is not greater than 7.5°.

7. The bendable device according to claim 5, wherein in an upward direction of ends at both sides of the first part of the connecting frame and the first part of the bracket in their longitudinal direction, two opposites end parts at each end are provided with a receiving groove and a projection respectively, and the bracket and the connecting frame are connected in such a way that, at each side end of the bracket and the connecting frame in the longitudinal direction of the elongate plate, a projection of the bracket is received in the receiving groove of the connecting frame, a projection of the connecting frame is received in the receiving groove of the bracket, so that the bracket and the connecting frame are spliced together and can move relative to each other, thus constituting the bendable housing, while an abutting projection of the connecting frame and a receiving groove of the bracket as well as an abutting receiving groove of the connecting frame and projection of the bracket constitute the overlapping portions.

8. The bendable device according to claim 7, wherein the receiving groove of the connecting frame restricts movement of the projection of the bracket, and the receiving groove of the bracket restricts movement of the projection of the connecting frame, thereby restricting relative movement between a plane where the first part of each bracket is located and a plane where the first part of the abutting connecting frame is located.

9. The bendable device according to claim 8, wherein an upper side of each bracket is provided with a corresponding cover board forming an upper cover of the bendable housing.

10. The bendable device according to claim 9, wherein each cover board is divided into a first part and a second part, the first and second parts are provided with a recess transition therebetween such that the first and second parts are located at different heights, the first part is connected at a top end of the bracket, when the bendable housing bends inward, the second part can be covered by the first part of the abutting cover board.

11. An electronic apparatus comprising a bendable device having a rigid receiving space, wherein the device comprises a bendable housing having
   a bendable plate,
   a plurality of brackets and a plurality of connecting frames placed on a first surface of the bendable plate, the brackets and the connecting frames being arranged in an alternating manner, with each abutting bracket and connecting frame overlapping with each other to define a bendable housing,
   a receiving space therein, and in the process of the bendable housing being bent, at least a part of the volume of the receiving space is free from bending influence, wherein the at least part volume of the receiving space free from the bending influence constitutes a rigid receiving space.

12. The electronic apparatus according to claim 11, wherein the bendable housing is provided with a support frame for supporting objects placed in the rigid receiving space.

13. A bendable device having a rigid receiving space, wherein the device comprises a bendable housing having
   a bendable plate,
   a plurality of brackets and a plurality of connecting frames placed on a first surface of the bendable plate, the brackets and the connecting frames being arranged in an alternating manner, with each abutting bracket and connecting frame overlapping with each other to define a bendable housing, wherein each abutting bracket and connecting frame overlap with each other by an overlapping portion that constitutes a stopper portion for the bracket such that the stopper portion restricts the extent by which the bracket moves to an inside and outside of the bendable housing, and wherein at least one connecting frame or at least one bracket is provided with a support frame for supporting objects placed in the rigid receiving space
   a receiving space therein,
   and in the process of the bendable housing being bent, at least a part of the volume of the receiving space is free from bending influence, such that the at least part volume of the receiving space free from the bending influence constitutes a rigid receiving space.

* * * * *